(12) United States Patent
Nevill (10) Patent No.: US 6,281,841 B1
(45) Date of Patent: Aug. 28, 2001

(54) DIRECTION DETERMINING APPARATUS

(75) Inventor: Richard Geoffrey Nevill, Auckland (NZ)

(73) Assignee: Techno International Limited, Auckland (NZ)

(*) Notice: Subject to any disclaimer, the term of this patent is extended or adjusted under 35 U.S.C. 154(b) by 0 days.

(21) Appl. No.: 09/269,219

(22) PCT Filed: Sep. 23, 1997

(86) PCT No.: PCT/NZ97/00118

§ 371 Date: Aug. 5, 1999

§ 102(e) Date: Aug. 5, 1999

(87) PCT Pub. No.: WO98/12572

PCT Pub. Date: Mar. 26, 1998

(30) Foreign Application Priority Data

Sep. 23, 1996 (NZ) ........................................ 299425

(51) Int. Cl.[7] ....................................................... G01S 5/02
(52) U.S. Cl. ...................... 342/424; 342/357.06; 342/417
(58) Field of Search ........................ 342/357.04, 357.06, 342/383, 417, 424, 442, 372; 701/213, 215

(56) References Cited

U.S. PATENT DOCUMENTS

| 4,204,655 | * | 5/1980  | Gulick et al. ................... 244/3.19 |
| 4,384,293 |   | 5/1983  | Deem et al. ..................... 343/113 |
| 4,486,757 | * | 12/1984 | Ghose et al. .................... 343/417 |
| 4,876,549 | * | 10/1989 | Masheff ........................... 342/417 |
| 5,146,231 |   | 9/1992  | Ghaem et al. ................... 342/419 |
| 5,461,387 |   | 10/1995 | Weaver ............................ 342/357 |
| 5,724,047 | * | 3/1998  | Lioio et al. ..................... 342/442 |

OTHER PUBLICATIONS

Derwent Abstract Accession No. 96–012981/02, JP 07–260480 A (Sokia), Oct. 13, 1995.

* cited by examiner

*Primary Examiner*—Dao Phan
(74) *Attorney, Agent, or Firm*—Jacobson, Price, Holman & Stern, PLLC (57) ABSTRACT

A system for determining the direction that an object is pointing is disclosed. The pointing direction is calculated by determining phase differences between signals arriving at different positions on the object from a single source. Preferably the signals are received from Global Positioning System satellites and multiple antennae are positioned appropriately on the object. A number of methods are disclosed to obtain both the integer and fractional parts of the phase difference. Once the absolute value of the phase difference is determined and the satellite positions are known, it is possible to determine the direction that the object is pointing. A number of possible applications are disclosed including aerial imaging, artillery weapons aiming and satellite receive dish alignment.

18 Claims, 6 Drawing Sheets

DIRECTION DETERMINING APPARATUS

FIELD OF THE INVENTION

This invention relates to a system for determining phase differences between signals and which is preferably utilised in a direction finding technique using satellite positioning systems (such as NAVSTAR or GLONASS) and in particular, but not solely the use of the technique to direct weapons in an artillery (or similar) system.

DESCRIPTION OF THE PRIOR ART

Infantry weapons simulation systems using lasers fitted to infantry weapons and laser beam sensitive apparel are well known. However, laser technology cannot be used in artillery simulation systems because artillery is usually employed out of sight of the targets. A useful simulation system must be able to indicate to targets if they have been "hit" when ground contours or ground cover impedes direct line of sight between weapons and targets. It would be desirable if the pointing direction of the barrel of an artillery piece could be ascertained accurately and quickly enough to allow a computer calculation of the point of impact of simulated shell fire which point could be radioed to soldiers in a battle exercise. If those soldiers were provided with satellite positioning receivers, such as GPS (Global Positioning System) receivers, and computing resources a comparison could be made of their position and the computed point of impact of the shells to provide a kill status.

Known devices for ascertaining direction of high accuracy include precision gyroscopes or inertial guidance systems. Such devices are very expensive.

GPS is used to determine direction of travel of an object by simply ascertaining the direction between two successive computed positions. Attempts have also been made to use the GPS system to determine the direction of pointing of a stationary object. U.S. Pat. No. 5,146,231 discloses a GPS direction finder which, in addition to a conventional omni-directional antenna, has a second antenna which is highly directional. From knowing the positions of the GPS receiver and a GPS satellite a bearing to the satellite is obtained and the directional antenna is used to determine the orientation of the direction finder axis with respect to the satellite.

The system disclosed in U.S. Pat. No. 5,146,231 has a number of disadvantages. In an artillery effects simulation the aim is to make the simulation equipment invisible to the trainees so that they can learn to operate the weapons in a realistic environment. The directional antenna is necessarily large to provide precision and must be rotated to measure direction, compromising the aims of the simulation. In addition, two antenna would be required to provide azimuth and altitude values for the direction finder. Finally, the direction finder is based on locating the null in the received signal as the antenna is moved, however the GPS signal is filled with noise and is difficult to locate precisely.

U.S. Pat. No. 5,461,387 discloses a GPS direction finder which uses a single multimode antenna to generate mode one and mode two signals and by determining the ratio of the amplitude of these signals the phase difference between the signals is ascertained which in turn produces a bearing to a GPS satellite. The system disclosed is optimised for low cost and small size and does not have sufficient precision to allow a simulation of the effects of artillery.

A method of direction measurement using a number of independent GPS receivers has been described by Cannon et al, ION GPS-92, Albuquerque, N.Mex. This method relies on accurately measuring the phase of the signal received from three or four satellites. Such accurate phase measurement requires that the receiver is locked on to the information structure of the GPS signal. The requirement of a clear view of three or preferably four satellites can be a problem in some applications. For example, in an artillery exercise situation a gunner will seek cover for his weapon and this will reduce the number of GPS satellites that can be "viewed" by the weapon direction finder. Further, there are practical disadvantages in constructing GPS receivers capable of accurate phase measurement. Still further, for the artillery simulation application, there are practical difficulties in obtaining sufficiently accurate measurements of the phase difference between two antennae when using separate receiver channels (a 'dual channel' system) to process the signals from each antenna. In dual channel systems, direct phase measurements are made between the output of separate correlators. As relative timing errors inherently occur between channels in a dual channel system, this type of system is inaccurate.

There is available a software package produced by the Department of Geometics of the University of Calgary and sold under the trade mark HEAD which receives input of partial (fractional number of cycles) phase difference measurements between signals from two GPS antennae and then determines the absolute phase difference (both integer and fractional parts) unambiguously between the signals for each satellite (phase difference may be used to determine direction as explained later in this specification). This is achieved by looking at all the available information from the satellite signals and then determining what phase difference value will fit in for all of the information obtained (effectively similar to solving a series of simultaneous equations by elimination). However, this system requires at least five satellites to be visible in order to work and therefore is unable to continually provide phase difference information when less than five satellites are visible.

SUMMARY OF THE INVENTION

It is an object of the invention to provide a directional finder which can function with a clear view of only two satellites and which goes some way towards overcoming the other disadvantages mentioned above.

In one aspect the invention consists in a method of determining the direction an object is pointing, using a position locating system and at least two omnidirectional microwave antennas spaced apart by a predetermined distance on a chosen axis of said object comprising:

(a) receiving at said antennas microwave signals from satellites at known positions, (b) phase shifting the signal from a first of said antennas through a range of phase angles, (c) summing the phase shifted signal with the signal from a second of said antennas, (d) extracting from the summed signal the signal from a first satellite using correlation techniques, (e) determining the magnitude of said correlated signal as a function of the phase shift of the phase shifted signal, (f) determining the phase shift at peak magnitude, (g) calculating the angle between said first satellite and said object axis using the angle of phase shift and said predetermined spacing of the said two antennas, (h) resolving the ambiguity associated with the unknown integer number of complete cycles in the phase difference of the signals received by the two antennas;

repeating steps (a) to (h) for signals from a second satellite to determine the angle between said second satellite and said object axis, deriving from said position locating system the ground position of the second antenna and the positions of said two satellites, calculating from the solid angles between each of said two satellites and the object axis, the positions of said satellites and the ground position of the second antenna, the two possible azimuth and elevational directions of the object axis, and resolving the ambiguity in direction by using directional information from another source.

In a further aspect the invention consists in a method of determining the direction in which a gun barrel is pointing, using a position locating system and at least two omnidirectional microwave antennas mounted on said barrel and spaced apart by a predetermined distance, which method comprises:

receiving at said antennas microwave signals from satellites at known positions, phase shifting the signal from a first of said antennas through a range of phase angles, summing the phase shifted signal with the signal from a second of said antennas, extracting from the summed signal the signal from a first satellite using correlation techniques, determining the magnitude of said correlated signal as a function of the phase shift of the phase shifted signal, determining the phase shift at peak magnitude, calculating the angle between said first satellite and said barrel using the angle of phase shift and said predetermined spacing of the said two antennas, repeating the above steps for signals from a second satellite to determine the angle between said second satellite and said object axis, deriving from said position locating system the ground position of the second antenna and the positions of said two satellites, calculating from the solid angles between each of said two satellites and the barrel, the positions of said satellites and the ground position of the second antenna, the two possible azimuth and elevational directions of the barrel, and resolving the ambiguity in direction by using directional information from another source.

In yet a further aspect the invention consists in a cannon fire simulation system wherein one or more cannons are each equipped with computing means, a radio data link, a satellite position finding receiver and a barrel direction finder which determines where each cannon is aimed, wherein each soldier in the simulation is fitted with second satellite position finding receiver, second computing means and a radio data link, said computing means stores ballistic data characteristic of the cannon and the shells it fires, said computer means computing the point of impact of any simulated shell firing from said ballistic information, the bearing from the direction finder and a digital contour map of the geographical area in which the cannon is located, the information of the point of impact and the shell type being transmitted by the radio data link to a battle ground control station, said battle ground control station transmitting to soldiers taking part in the simulation the impact point and type of shell via the data link, said second computing means at each soldier compares the received position information with the soldier's location as determined by said second satellite position finding receiver and directs a killed status if the soldier is computed to be in the impact zone, the system being characterised in that each barrel direction finder includes at least two omnidirectional microwave antennas mounted on said barrel a predetermined distance apart and direction is determined by (a) receiving at said antennas signals from at least two satellites, (b) phase shifting the signal from a first of said antennas through a range of phase angles, (c) summing the phase shifted signal with the signal from a second of said antennas, (d) extracting from the summed signal the signal from a first satellite using correlation techniques, (e) determining the peak magnitude of said correlated signals a function of the phase shift of the phase shifted signal, (f) determining the phase shift at peak magnitude, (g) calculating the angle between said first satellite and said barrel using the angle of phase shift and said predetermined spacing of the said two antennas, repeating steps (a) to (g) for signals from a second satellite to determine the angle between said second satellite and said barrel, deriving from said satellite position locating receiver the ground position of the second antenna and the positions of said two satellites, calculating from the solid angles between each of said two satellites and the barrel, the positions of said satellites and the ground position of the second antenna, the two possible azimuth and elevational directions of the barrel, and resolving the ambiguity in direction by using directional information from another source.

In a yet further aspect the invention consists in a direction finder comprising:

a position locating device, at least two omnidirectional microwave antennas spaced apart on a base line by a predetermined distance adapted to receive signals from satellites whose position is known at the time of transmission, a phase shifter which phase shifts the satellite signals received at a first of said antennas through a range of phase angles, a summer which sums the phase shifted signal with the satellite signals received at a second of said antennas, a correlator which successively extracts from the signal at the output of the summer the signals of two satellites, means for determining the magnitude of each correlated signal as a function of the phase shift of the phase shifted signal, means for determining the phase shift at peak magnitude, and CPU means receiving as inputs the phase shift angles corresponding to each of the two satellites and said predetermined spacing of the said two antennas, said CPU means calculating the solid angle between each satellite and said antenna base line, said CPU means also receiving as inputs the ground position of the second antenna and the positions of said two satellites from the output of said position locating device, calculating from the angles between each of said two satellites and the antenna base line the two possible azimuth and elevational directions of the antenna base line, and resolving the ambiguity in direction by using directional information from another source.

The invention consists in the foregoing and also envisages constructions of which the following gives examples.

BRIEF DESCRIPTION OF THE DRAWINGS

One preferred form of the present invention will now be described with reference to the accompanying drawings in which.

DETAILED DESCRIPTION OF THE PREFERRED EMBODIMENTS

Figure 1:
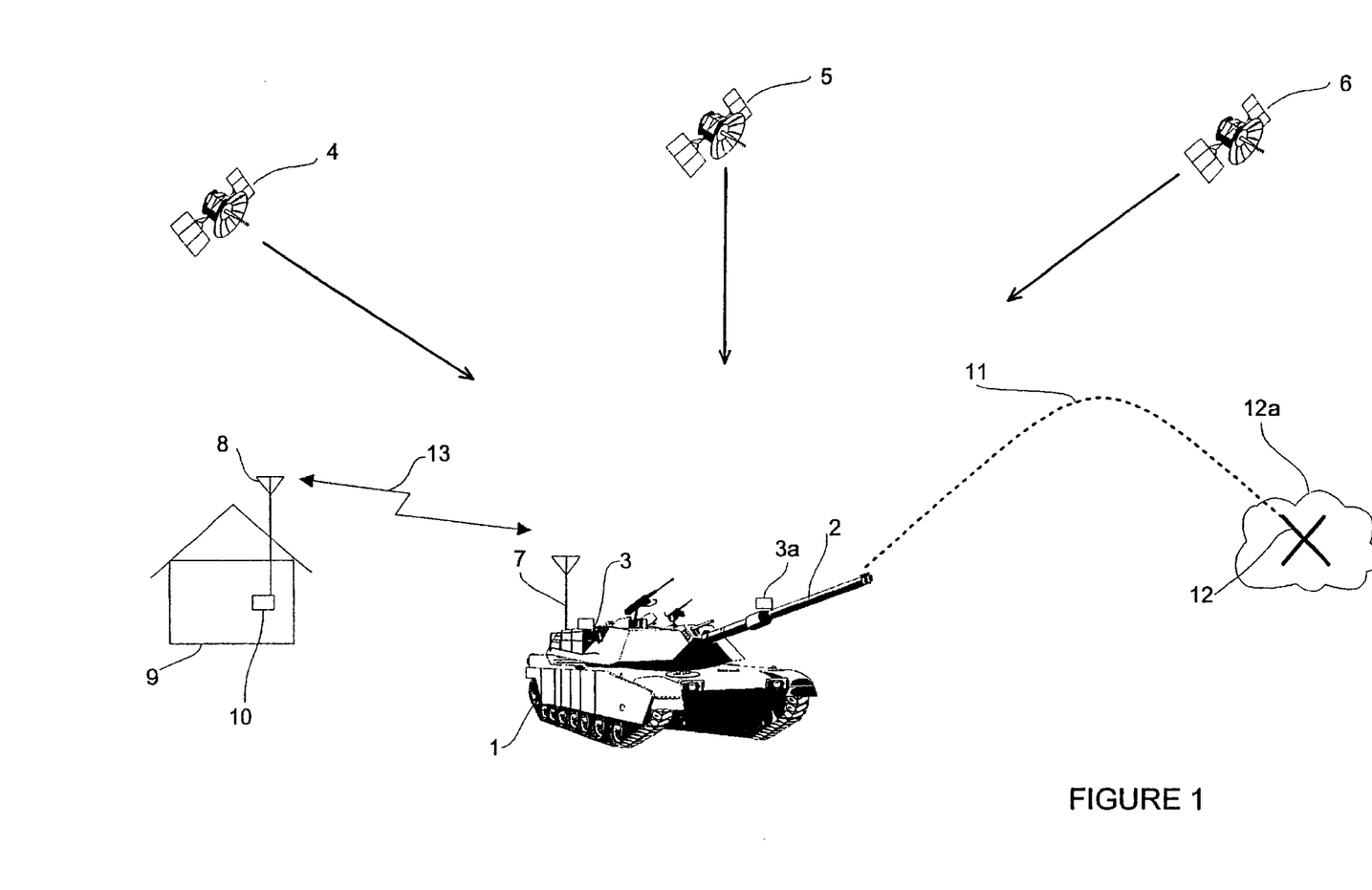
FIG. 1 is a schematic diagram of a battlefield showing a tank incorporating the GPS direction finder according to the present invention.

With reference to the drawings and in particular FIG. 1, one possible application of the GPS direction finder according to the present invention will be described with reference to a system for determining the direction of a barrel so that the trajectory and point of impact of a shell may be calculated. It should be noted that this is only a representative example of a use of the direction determining apparatus according to the present invention and has been used to simplify the explanation of how the invention may be put into effect. A GPS (Global Positioning System) direction finder 3 according to one preferred embodiment of the present invention is mounted on gun barrel 2 of a tank 1 positioned on a battlefield, the barrel 2 defining an object axis. The GPS direction finder 3 includes a group of microwave or GPS antenna 3a. A number of GPS satellites (for example satellites 4, 5 and 6) are clearly visible to the antennae 3a of GPS direction finder 3 which receives GPS signals from the visible satellites. A transceiver 7 is also mounted to tank 1 and is connected to receive signals from GPS direction finder 3 and to relay those signals to a second transceiver at a central communications control centre 9. A central control computer 10 at central communications control centre 9 receives transmissions from the GPS direction finder 3 and may also transmit signals back to the GPS direction finder 3 to supply information to the occupants of the tank 1.

In a simulated battle, in order to determine where a projectile would land if fired from tank 1, it is necessary to determine the direction (in three dimensions) in which the barrel is pointing when the projectile is "fired" and to combine this with ballistic information (supplied by the manufacturer of the projectile) for the particular projectile when fired from the tank as well as meteorological information such as wind and/or rain strength and direction. Accordingly, once the direction of the barrel of the tank and the location of the tank is known, it is possible to then determine the trajectory 11 of the projectile. If a contour map of the area surrounding the tank is available, then it is possible to determine the point of impact 12 of the projectile with the ground (including impact with topographical features such as hills).

The GPS direction finder 3 according to the present invention is able to determine the direction that the barrel of tank 1 is pointing (the method by which this is achieved will be described below) and to transmit this information to the central communications control centre 9 along with information on the type of projectile "fired" and the direction of the tank 1 (from a standard GPS receiver mounted on the tank). The central control computer 10 receives the projectile direction information and uses this in a trajectory calculation in conjunction with the manufacturer supplied ballistic information. The resulting trajectory 11 information may, for example, be in the form of a series three dimensional co-ordinates (x, y, z) defining the position in space of the projectile at discrete moments in time or may alternatively comprise an equation relating the x, y and z co-ordinates of the projectile position against time. The central control computer also stores information of the terrain of the battle area, for example, in the form of a digital "map" which includes latitude, longitude and elevation information for discrete points on the battlefield. In order to determine the point of impact 12 of the projectile, it is necessary to then determine the first point along the trajectories path which coincides with a point on the digital map. It should be noted that the point of impact calculation could be carried out at the tank 1 and then transmitted to the central communications control centre 9. From the point of impact 12, an impact zone 12a can be determined, the size of which is dependent on the type of shell "fired" from the tank 1.

The central communications,computer 10 then transmits the point of impact and type of projectile via signal 13 to battle simulation participants (soldiers) in the battlefield. The participants carry GPS receivers and computational equipment which compares their location with that of the point of impact and "kill" themselves (by informing the central communications control centre that they have been "hit") and take no further part in the simulated battle. Alternatively, if each of the participants in the simulated battle were electronically monitored, the central communications control computer 10 could receive the positional information for each of the participants and automatically determine whether any participants were within the impact area of the "fired" projectile and then inform the participants accordingly.

The crew of tank 1 are informed by the central communications control centre when participants in the battle have been "hit" due to the firing of their projectiles. Preferably, a Liquid Crystal Display (LCD) is mounted within tank 1 and connected to GPS direction finder 3 so as to display the trajectory of the shell superimposed upon the view seen through the gunner's sight. The trajectory of the shell may, for example, be displayed until the shell passes behind a hill or other topographical features at which point the tracking of the trajectory ends in order to simulate actual battle visual feedback. Differential correction of the participants' GPS position information can be carried out to improve the accuracy of the position measurement.

Figure 2:
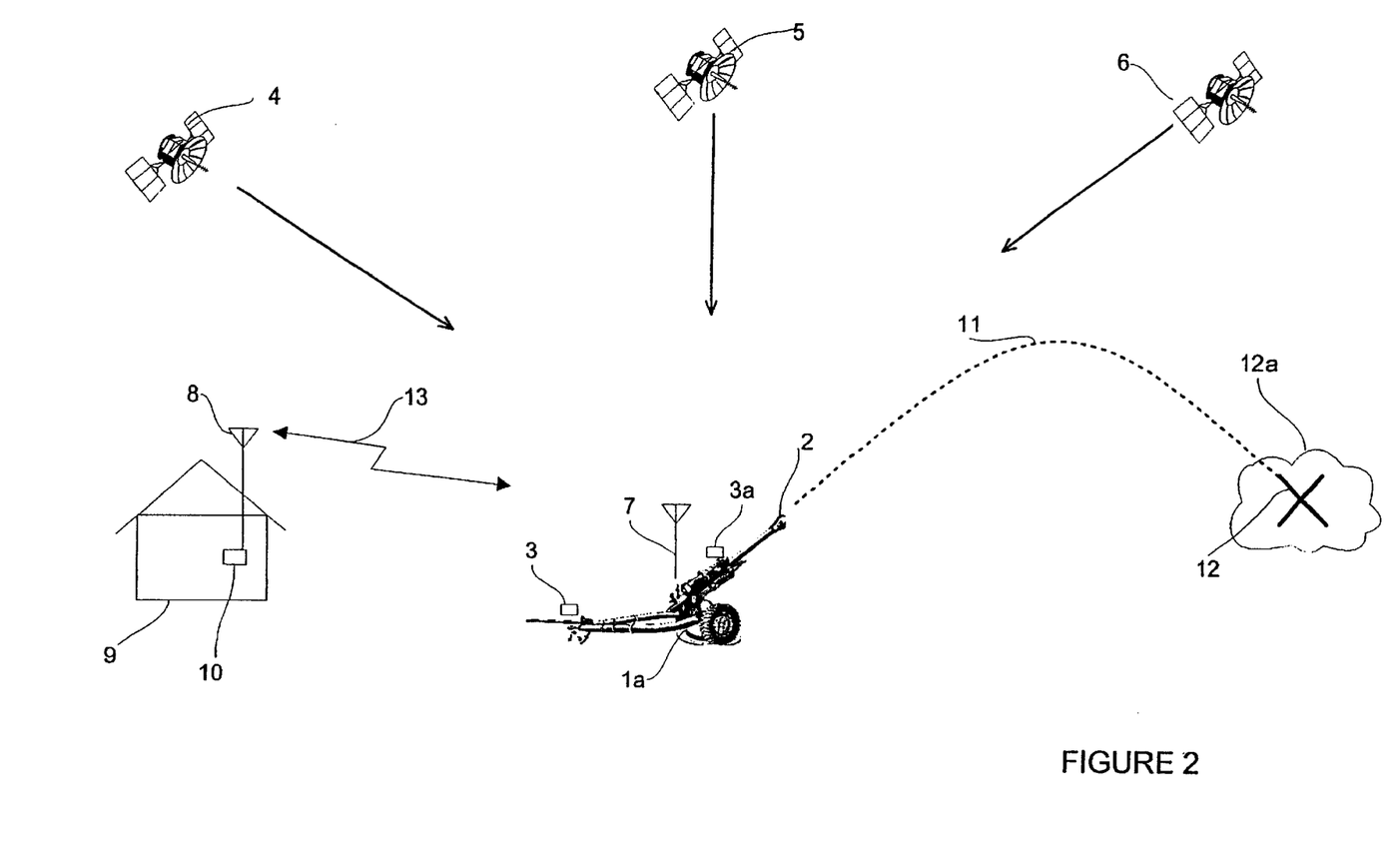
FIG. 2 is a schematic diagram of a battlefield showing a large field gun incorporating the GPS direction finder according to the present invention.

An alternative application for the present invention is shown in FIG. 2 in which the GPS direction finder 3 and a group of GPS antenna 3a are mounted on a large field gun 1a.

It should be noted that any reference in this specification to GPS (Global Positioning System) could be substituted for any type of positioning system based on navigational satellites (such as NAVSTAR or GLONASS satellites) or any other system which uses similar principles.

Method of Determining Barrel Direction
Phase Difference Calculation

Figure 3:
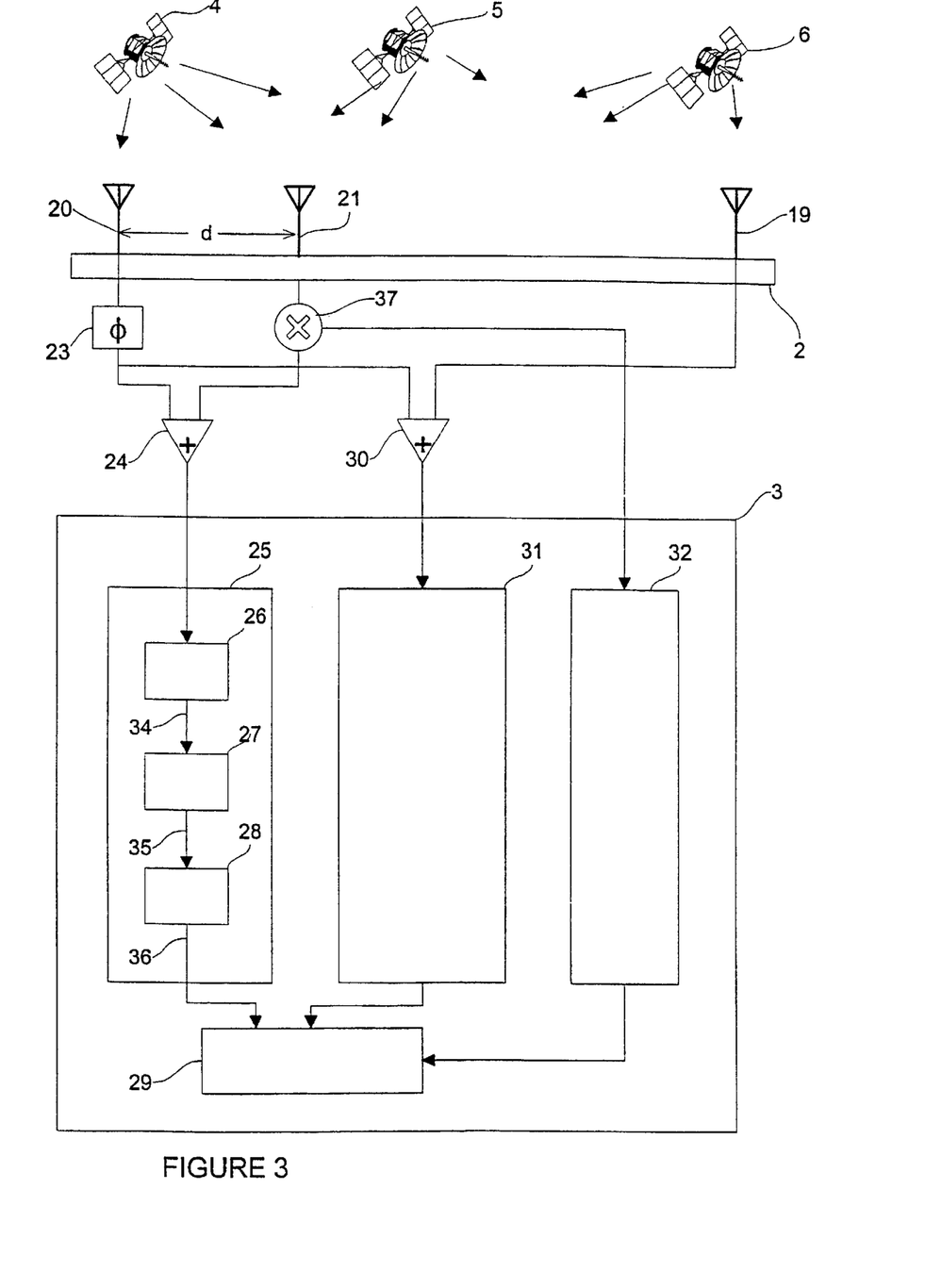
FIG. 3 is a block diagram of one preferred embodiment of the GPS direction finder in FIG. 1.

With reference the drawings and in particular FIG. 3, it can be seen that two antennae (20 and 21) are mounted on barrel 2a distance 'd' apart. Preferably the distance 'd' is approximately one ½ wavelength of the GPS signal (approximately 100 mm). As the (microwave) signals from each GPS satellite (for example satellite 4) travel towards the GPS antennae 19, 20 and 21, the signal will first be received by antenna 20 (as it is closer to satellite 4) and then the signal will be received by antenna 21. By comparing the signals received at antenna 20 with the signal received by antenna 21, it is possible to determine the phase difference between the two signals. In the system according to the present invention, this signal comparison is earned out utilising a single channel of a GPS receiver for multiple satellites. Accordingly, in order to isolate signals or summed signals for specific satellites it is necessary to use well known correlation or filtering techniques. This is preferably determined by passing one of the received signals, for example the signal received by antenna 20, through a phase shifter 23. The phase shifter is varied from 0° of phase shift up to 360° of phase shift and the output added by summing block 24. The phase shifter could vary the phase angle in 90° steps, or preferably, the phase shifter varies the phase shift in increments of 22.5° producing a series of data values (16 values per period of the sinusoidal waveform).

The phase shifter 23 preferably comprises four segments of micro-strip line giving the preferably required phase changes of 22.5°, 45°, 90° and 180°. Preferably the circuitry for the phase shifter 23, the summing block 24 and signal splitter 37 (the reason for splitter 37 is mentioned further below) is implemented on the same microwave stripline to minimise losses and maximise stability and accuracy. Preferably the switches within the phase shifter are PIN diodes and any combination of the four phase shifts may be applied such that the resulting combined phase shift may be stepped from 0° to 360° in sixteen increments.

The output of summing block 24 is fed into a customised GPS receiver 25. The customised GPS receiver 25 includes a correlator 26 which extracts the actual GPS signal from background noise by correlating the received signal with separate known codes (known as "Gold codes") for each GPS satellite. The output of the correlator 26 is passed to a power conversion stage 27 in which the real and imaginary parts of the correlated signal 34 are squared and summed to produce a power signal 35 which is a scalar value representing the power received from the satellite for a particular phase shift angle. The power signal 35 varies in a sinusoidal manner as the phase shifter cycles through 360°.

The power samples (power signal 35) are processed by Fourier analysis (block 28). The Fourier analysis extracts the Fourier coefficient at the frequency that matches the repetition rate of the phase shifter. For example if the phase shifter cycles through all sixteen steps in one tenth of a second the Fourier coefficient at 10 Hz is extracted. This coefficient is a complex number whose magnitude and argument define, respectively, the amplitude and phase of the sinusoid that best fits the observed series of power samples. Consequently the argument of the Fourier coefficient is the best estimate of the position of the peak power sample and hence the difference in phase of signals received by antennas 20 and 21 respectively.

Within the customised GPS receiver 25 there are preferably at least three or more separate channels that independently perform the correlation 26, power conversion 27 and Fourier analysis 28 functions so that three or more satellites may be tracked simultaneously and phase difference estimates 36 may be derived for each satellite and passed on to direction calculator 29.

The measurements made by receiver 25 derived from the closely spaced antennas 20 and 21 give a coarse but unambiguous measurement of the angles of signals received by the antennas from each satellite. A second customised GPS receiver 31 processes signals derived from antennas 20 and 19 which are spaced apart as far as practically possible on barrel 2 of tank 1. The signals from antennas 20 and 19 are combined in a second summing device 30 before being passed into the second customised GPS receiver 31. The customised GPS receiver 31 includes the same correlator, power conversion and Fourier analysis modules as customised GPS receiver 25 although they are not shown in the drawing. The phase angle measurements made by customised GPS receiver 31 result in fine measurement of the phase angles of signals (from the same source) received by the antennas from each satellite but do not resolve the integer number of cycles of phase difference that may exist between the antennas 20 and 19.

This may be achieved by calculating a scale factor which is the distance between antennae 20 and 21 divided by the distance between antennae 20 and 19. This scale factor is then multiplied together with the fine but unambiguous phase difference determined using the widely spaced antennae 20 and 19 to obtain an estimate of the phase difference between closely spaced antennae 20 and 21. The integer phase difference can then be deduced from the integer part of the estimated phase difference.

It should be noted that the inclusion of antenna 21 is not required by the present invention but is merely a preferred addition. Accordingly, only two antennae (19 and 20) are sufficient to obtain very accurate phase angle difference values for the fractional part of the actual phase angle difference and a number of other techniques may be relied upon to determine the number of whole cycles making the actual phase difference. Alternative instruments and methods to remove the ambiguity include inclinometers that measure vertical orientation with respect to the gravitational field, magnetic compasses, dead reckoning based on measured or assumed angular velocity, gyroscopes to measure the angular velocity and advanced GPS phase difference analysis techniques such as the HEAD™ software.

The HEAD™ software may alternatively be used to initially determine an accurate and unambiguous heading if five or more satellites are in view and then the GPS direction finder of the present invention could be used to track changes in direction, needing only two antennae and two or more satellites to be visible.

Determining Actual Pointing Direction from Phase Difference Value

The phase measurements, both coarse (from receiver 25) and fine (from receiver 31) are passed to the direction calculator 29 which determines a direction (the direction which the barrel 2 is pointing) consistent with both the coarse and fine measurements.

For the direction calculator 29 to carry out the calculations necessary to determine the direction in which barrel 2 is pointing, the absolute position of both the tank 1 and each satellite are required. It is possible for either receiver 25 or 31 to provide the tank and satellite positions but preferably a standard GPS receiver 32 is provided within GPS direction finder 3 which is fed with a signal from antennae 21, through a splitter 37, which is not degraded by a phase shifter.

Figure 5:
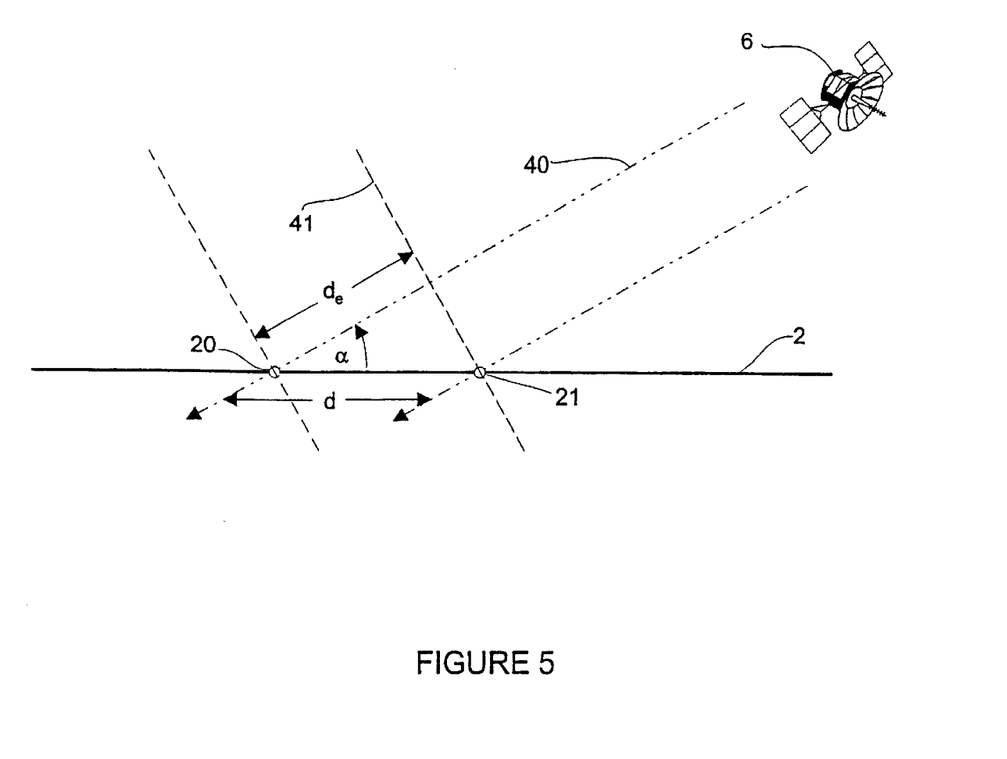
FIG. 5 is a schematic diagram showing the geometry and distances involved in determining the angle α between the barrel and a satellite within the direction finder block of the GPS direction finder of FIG. 1.

To determine the angle from the barrel 2 of tank 1 to each satellite, a calculation is carried out by direction calculator 32 at tank 1 in turn on the values $\phi_4$, $\phi_5$ and $\phi_6$ and this will be demonstrated in relation to FIG. 5. The distance between the two antennae 20 and 21 is accurately known (about 100 mm) and a line 40 from antennae 20 (this can be assumed to be the origin) to the satellite (for example satellite 6) forms an angle $\alpha$ with the barrel of tank 1. A right angled triangle is formed by a line between the two antennae, the line 40 from antennae 20 to satellite 6 and a line 41 from antennae 21 which intersects the line from the satellite to antennae 20. The length of the hypotenuse is 100 mm while the length of the next longest side is equal to the extra distance ($d_e$) travelled by the GPS signal from satellite 6 in reaching antenna 20 compared to antenna 21. The extra distance is less than one wavelength and is equal to the fraction of one wavelength ($\lambda$) travelled by the wave in phase shift $\phi$. That is, the extra distance $d_e$, is $(\phi/360°) \times \lambda$. For example, if $\lambda=0.19$ m and if the maximum correlator output was found to occur at a phase shift of $\phi=110°$, then the extra distance $d_e$ would be $(110/360) \times 0.19$ m or 0.058 m. The angle $\alpha$ can then easily be calculated as $\alpha=\cos^{-1}(d_e/d)$ or in the case of the example, $\alpha=\cos^{-1}(0.058/0.1)=54.5°$. Accordingly, for each satellite, an angle from the barrel 2 of tank 1 to each of the satellites 4, 5 and 6 respectively $\alpha_4$, $\alpha_5$ and $\alpha_6$ can easily be determined.

Once the fractional phase difference and its ambiguity have been resolved and the angles from the barrel to each satellite determined, then from the known positions of the satellites the orientation of the barrel can be deduced as follows. In order to determine the direction in which the barrel 2 of tank 1 is pointing (in three dimensions), it is necessary to first produce a line from the origin (tank 1) to each satellite and this will be described with reference to FIG. 6. It can be seen that three lines ($l_4$, $l_5$ and $l_6$) individually connect the origin to the three satellites 4, 5 and 6. The equations of these lines are determined from the information obtained from the standard GPS receiver 32 which has determined the position of the origin and the positions of each satellite. Centrally superimposed on each of the lines $l_4$, $l_5$ and $l_6$ are cones $c_4$, $c_5$ and $c_6$. Each of the cones begin at the origin and continue away from the origin along their respective lines. Each of the cones represent the locus of the directions in which the barrel could possibly be pointing according to the calculations made using one satellite. The solid angle at the apex of each cone is twice the angle between the specific satellite and the barrel 2 of tank 1.

Figure 6:
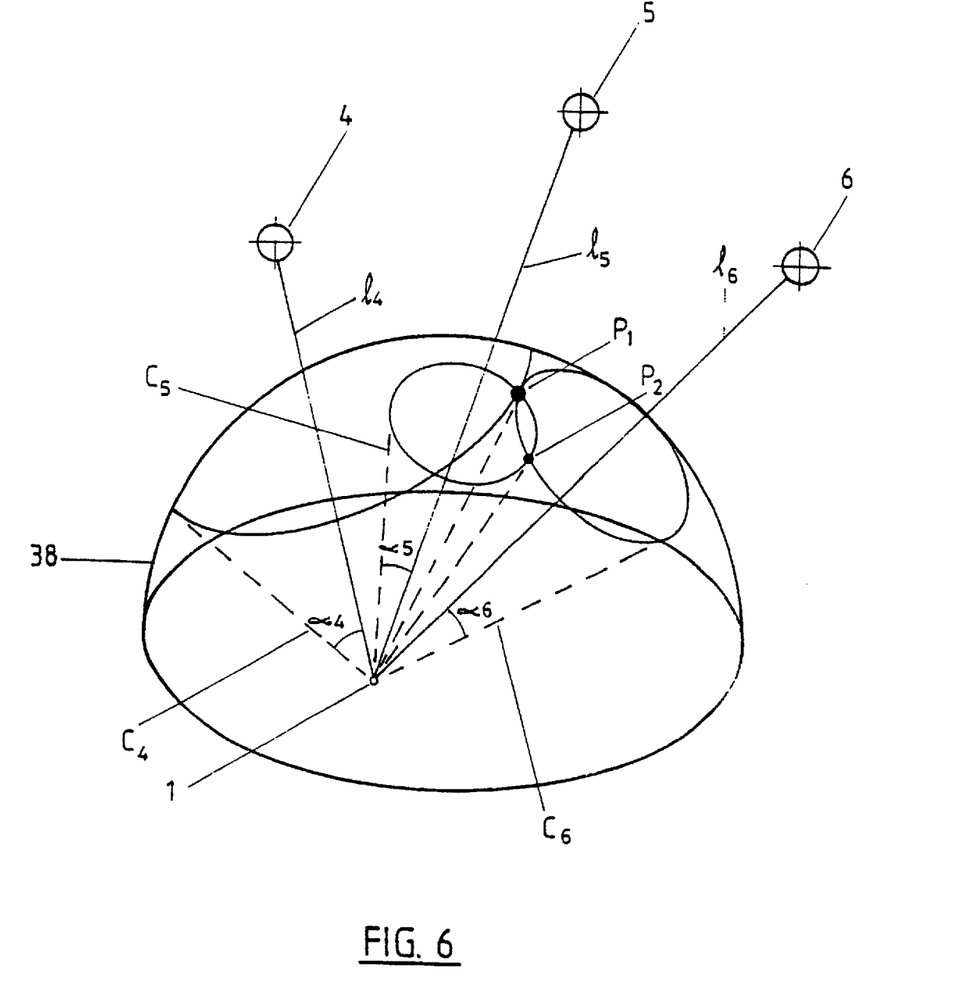
FIG. 6 is a schematic diagram showing how the direction of the tank barrel is determined using the GPS direction finder shown FIG. 1.

The line of intersection of the three (solid) cones is a line along barrel 2. In order to simplify the determination of the line of intersection, a sphere 38 of unit radius is drawn and the points of intersection of each cone with the sphere are marked as three circles. These circles represent the locus of all possible gun muzzle positions according to the readings taken from each satellite and it is then a matter of obtaining the equation of each circle (or alternatively, determining a set of discrete points on each circle) and solving the equations to find the point of intersection $P_1$ of all three circles. A line between the origin and point $P_1$ is then used to represent the barrel 2 of tank 1 and this information may then be used to obtain a pointing direction (or to determine the azimuth and elevational directions of the barrel) for subsequent use to determine the point of impact of the projectile fired through the barrel.

An alternative method to transform the phase measurements into the pointing direction is to use software such as HEAD™ which is capable of processing phase difference signals produced with the aid of GPS receivers.

The above described process for determining the instantaneous pointing direction of the barrel is preferably carried out occasionally on a timed basis or alternatively, as required to provide a new pointing direction should the barrel have moved.

Alternative Embodiment to Determine Phase Shift

Figure 4:
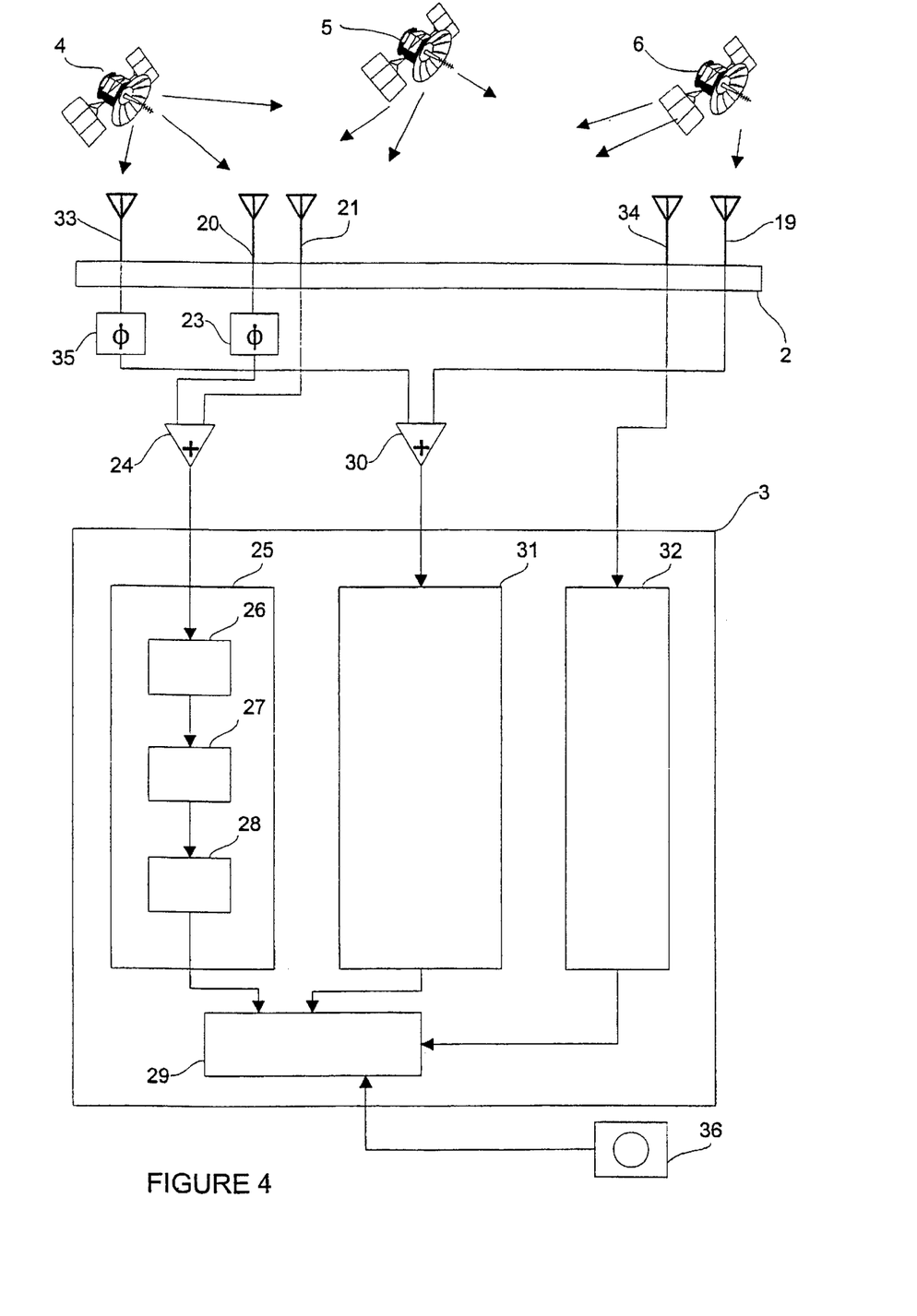
FIG. 4 is a block diagram of an alternative preferred embodiment of the GPS direction finder in FIG. 1.

With reference to FIG. 4, an alternative preferred embodiment of the GPS direction finder according to the present invention is shown in which five antennas are used (19, 20, 21, 33 and 34). The embodiment shown in FIG. 4 carries out the same functions as that shown in FIG. 3 with the inclusion of an additional phase shifter 35 which shifts the phase of the signal received by antenna 33 before the phase shifted signal is added to the signal received by antenna 19 in summing device 30 to provide the fine phase difference value. The signals received by antenna 20 and 21 are processed as for the embodiment of FIG. 3 to provide the coarse phase difference value and a separate GPS antenna 34 feeds signals solely to the standard GPS receiver 32. The embodiment of FIG. 4 may eliminate the possibility of mismatch in the summing devices causing errors in the phase shifted signals.

In addition, an inertial motion tracking system, such as a gyroscope 36 may be incorporated in the embodiment of FIG. 4 to provide a means for detecting movements which occur between GPS measurements and to thus provide short term stability to the pointing direction readings. For example, the GPS direction finder according to the present invention could provide an accurate pointing direction signal every one minute, while between accurate samples, the gyroscope 36 could provide accurate directional change input to the direction calculator 29. The gyroscope 36 need not be an expensive, highly accurate gyroscope, so long as it is able to accurately track for up to one minute. At the end of the one minute period, the GPS direction finder may then "reset" the gyroscope 36. The gyroscope offers the ability to track movement more rapidly than would otherwise be possible and by removing the urgency to provide GPS measurements it allows the GPS measurements to be averaged over a longer period which improves the accuracy.

It should be noted that, once the point of intersection of the three circles has been determined it will be possible to accurately determine the changing position of the gun barrel even if one of the three satellites becomes hidden from view (for example behind a building). This is possible as the cones of the two remaining satellites will always intersect at up to two points. As a starting point has been established with the three satellites in view, it is possible to determine which of the remaining two points ($P_1$ or $P_2$) is the actual end point of the barrel and to then monitor changes in that point without necessarily knowing the position of the other intersection point.

It should also be noted that it would be possible to determine the direction of the barrel using only two satellites and then resolving the ambiguity between the two obtained points by utilising directional information from another source (such as a gyroscope) rather than a third satellite (which may not always be available).

FIG. 6 is drawn to emphasise the principles of the method but it does not represent a typical case. In practice it is best to observe satellites whose relative angle to the axis of the gun is as large as possible. This results in the biggest possible changes in phase difference as the gun swings and hence the greatest sensitivity in the measurement. A side effect of this geometry is that the two intercepts of the circles of position are on opposite sides of the sphere of locus of the muzzle and consequently the correct intercept is probably the one that is nearest to the last known position.

While a practical embodiment of the invention has been described with reference to its use in an artillery simulation system, the direction finder of the present invention has many other applications. The present direction finder can function as a very accurate compass unaffected by the proximity of magnetic materials such as steel which degrade the accuracy and reliability of magnetic compasses. Furthermore, the present direction finder is considerably less expensive than the currently available alternative to magnetic compasses, namely the gyrocompass. Thus the GPS direction finder of the present invention can be used in the navigation of ships, planes, and other transportation vehicles. The invention is also applicable to use in equipment which requires precise aiming such as satellite receiver dishes (for tracking non-geosynchronous satellites), telescopes and artillery weapons aiming (rather than detecting when a projectile will land as has already been described). The invention is also applicable in situations where accurate headings are required such as in shipping, aircraft and aerial imaging for mining (wherein the precise spacial orientation and path of an aircraft must be recorded, including small deviations from a set course). In addition, the present invention could be incorporated into a system where it is merely one component of a system which is used to determine a 'best estimate' of direction, the output of the GPS direction finder being suitably combined with outputs of other devices such as gyroscopes, clinometers, digital compasses and the like.

Thus at least in the preferred form, the present invention produces an accurate yet relatively simple and inexpensive direction finder.

What is claimed is:

1. A method of determining direction in which an object is pointing, using a position locating system and at least two omnidirectional microwave antennas spaced apart by a predetermined distance on a chosen axis of said object comprising:
    (a) receiving at said antennas microwave signals from satellites at known positions,
    (b) phase shifting the signal from a first of said antennas through a range of phase angles,
    (c) summing the phase shifted signal with the signal from a second of said antennas,
    (d) extracting from the summed signal the signal from a first satellite using correlation techniques,
    (e) determining the magnitude of said signal from said first satellite as a function of the phase shift of the phase shifted signal,
    (f) determining the phase shift at peak magnitude,
    (g) calculating the angle between said first satellite and said object axis using the angle of phase shift and said predetermined spacing of the said two antennas,
    (h) resolving the ambiguity associated with the unknown integer number of complete cycles in the phase difference of the signals received by the two antennas;
    repeating steps (a) to (h) for signals from a second satellite to determine the angle between said second satellite and said object axis,
    deriving from said position locating system the ground position of the second antenna and the positions of said two satellites,
    calculating from the solid angles between each of said two satellites and the object axis, the positions of said satellites and the ground position of the second antenna, the two possible azimuthal and elevational directions of the object axis, and resolving the ambiguity in direction by using directional information from another source.

2. A method of determining the direction an object is pointing as claimed in claim 1 wherein said satellites are GPS satellites and said position locating system is a conventional GPS receiver.

3. A method of determining the direction an object is pointing as claimed in claim 2 wherein said conventional GPS receiver obtains GPS satellite signals from said second antenna.

4. A method of determining the direction an object is pointing as claimed in claim 1 wherein said step (h) is achieved by
    locating a third antenna on said object axis spaced apart from said second antenna by a second smaller predetermined distance;
    receiving at said third antenna signals from satellites;
    summing this signal with a portion of the phase shifted signal from the first said antenna;
    extracting from this summed signal the signal from a first satellite using correlation techniques;
    determining the magnitude of this correlated signal as a function of the phase shift of the phase shifted signal from the first antenna;
    determining the phase shift of the signal from the first antenna that produces the peak magnitude;
    calculating an approximate unambiguous estimate of the angle between said first satellite and said object axis using this phase shift and said predetermined spacing of said first and said third antennas.

5. A method of determining the direction an object is pointing as claimed in claim 1 wherein step (h) is achieved by using approximate phase or angle information from a non-satellite source and finding which solution best fits with the measurements made.

6. A method of determining the direction an object is pointing as claimed in claim 4 when a third antenna is used to resolve the phase ambiguity the method is simplified by calculating a scale factor which is equal to the distance between said first antenna and said second antenna divided by the distance between said first antenna and said third antenna and multiplying the phase difference measured between said first antenna and said third antenna by said scale factor to produce an estimate of the phase difference between said second antenna and said first antenna and resolving the ambiguity by finding which integer number of cycles when added to the phase difference measured between said first antenna and said second antenna produces a value which most closely matches the approximate value derived from measurements on said first antenna and said third antenna.

7. A method of determining the direction an object is pointing as claimed in claim 1 wherein steps (a) to (g) are repeated for signals from a third satellite and the solid angle between said third satellite and said object axis is used in the calculation of azimuth and elevational direction of the object axis to determine which of the two possible directions derived by the initial calculation is correct.

8. A method of determining the direction an object is pointing as claimed in claim 1 when the direction finder derives unambiguous azimuth and elevational directions subsequent calculations are made using the signals from only two satellites, these calculations functioning as corrections to the previously found unambiguous direction.

9. A method of determining the direction an object is pointing as claimed in claim 1 wherein the angles of phase shift at peak magnitude is derived by performing a Fourier analysis of each signal extracted by correlation to produce a best fit sine wave for each satellite.

10. A method of determining the direction an object is pointing as claimed in claim 1 wherein an inertial motion tracking system is used to determine the direction of the object axis for short periods of time and the object axis direction as determined by the above methods is used to periodically correct the direction provided by the inertial motion tracking system.

11. A method of determining the direction in which a gun barrel is pointing, using a position locating system and at least two omnidirectional microwave antennas mounted on said barrel and spaced apart by a predetermined distance on a chosen axis of said object, which method comprises:

receiving at said antennas microwave signals from satellites at known positions, phase shifting the signal from a first of said antennas through a range of phase angles, summing the phase shifted signal with the signal from a second of said antennas, extracting from the summed signal the signal from a first satellite using correlation techniques, determining the magnitude of said signal from said first satellite as a function of the phase shift of the phase shifted signal, determining the phase shift at peak magnitude, calculating the angle between said first satellite and said barrel using the angle of phase shift and said predetermined spacing of the said two antennas, repeating the above steps for signals from a second satellite to determine the angle between said second satellite and said object axis, deriving from said position locating system the ground position of the second antenna and the positions of said two satellites, calculating from the solid angles between each of said two satellites and the barrel, the positions of said satellites and the ground position of the second antenna, the two possible azimuth and elevational directions of the barrel, and resolving the ambiguity in direction by using directional information from another source.

12. A cannon fire simulation system wherein one or more cannons are each equipped with computing means, a radio data link, a satellite position finding receiver and a barrel direction finder which determines where each cannon is aimed, wherein each soldier in the simulation is fitted with second satellite position finding receiver, second computing means and said radio data link, said computing means stores ballistic data characteristic of the cannon and the shells it fires, said computing means computing the point of impact of any simulated shell firing from said ballistic information, the bearing from the direction finder and a digital contour map of the geographical area in which the cannon is located, the information of the point of impact and the shell type being transmitted by the radio data link to a battle ground control station, said battle ground control station transmitting to soldiers taking part in the simulation the impact point and type of shell via the data link, said second computing means at each soldier compares the received position information with the soldier's location as determined by said second satellite position finding receiver and directs a killed status if the soldier is computed to be in the impact zone, the system being characterized in that each barrel direction finder includes at least two omnidirectional microwave antennas mounted on said barrel a predetermined distance apart and direction is determined by (a) receiving at said antennas signals from at least two satellites, (b) phase shifting the signal from a first of said antennas through a range of phase angles, (c) summing the phase shifted signal with the signal from a second of said antennas, (d) extracting from the summed signal the signal from a first satellite using correlation techniques, (e) determining the peak magnitude of said signals from said first satellite a function of the phase shift of the phase shifted signal, (f) determining the phase shift at peak magnitude, (g) calculating the angle between said first satellite and said barrel using the angle of phase shift and said predetermined spacing of the said two antennas, repeating steps (a) to (g) for signals from a second satellite to determine the angle between said second satellite and said barrel, deriving from said satellite position locating receiver the ground position of the second antenna and the positions of said two satellites, calculating from the solid angles between each of said two satellites and the barrel, the positions of said satellites and the ground position of the second antenna, the two possible azimuth and elevational directions of the barrel, and resolving the ambiguity in direction by using directional information from another source.

13. A direction finder comprising a position locating device, at least two omnidirectional microwave antennas spaced apart on a base line by a predetermined distance adapted to receive signals from satellites whose position is known at the time of transmission, a phase shifter which phase shifts the satellite signals received at a first of said antennas through a range of phase angles, a summer which sums the phase shifted signal with the satellite signals received at a second of said antennas, a correlator which successively extracts from the signal at the output of the summer the signals of two satellites, means for determining the magnitude of each correlated signal as a function of the phase shift of the phase shifted signal, means for determining the phase shift at peak magnitude, and CPU means receiving as inputs the phase shift angles corresponding to each of the two satellites and said predetermined spacing of the said two antennas, said CPU means calculating the solid angle between each satellite and said antenna base line, said CPU means also receiving as inputs the ground position of the second antenna and the positions of said two satellites from the output of said position locating device, calculating from the angles between each of said two satellites and the antenna base line the two possible azimuth and elevational directions of the antenna base line, and resolving the ambiguity in direction by using directional information from another source.

14. A direction finder as claimed in claim 13 wherein said satellites are GPS satellites and said position locating system is a conventional GPS receiver.

15. A direction finder as claimed in claim 13 wherein said correlator extracts the signal from a third satellite, said CPU means receives the phase shift angle corresponding to said third satellite and the angle between said third satellite and the antenna base line is calculated by the CPU means to be used in the calculation of the azimuth and elevational directions of the antenna base line to resolve the ambiguity in the two possible directions as determined when the signals from only two satellites are used.

16. A direction finder as claimed in claim 13 when the direction finder derives unambiguous azimuth and elevational directions subsequent calculations can be made using the signals from only two satellites, these calculations functioning as corrections to the previously found unambiguous direction.

17. A direction finder as claimed in claim 13 wherein an inertial motion tracking system is used to determine the direction of the object axis for short periods of time and the object axis direction as determined by the above methods is used to periodically correct the direction provided by the inertial motion tracking system.

18. A direction finder as claimed in claim 14 wherein said conventional GPS receiver obtains GPS satellite signals from said second antenna.

* * * * *